Feb. 13, 1934.  W. S. BOWEN  1,946,566
METHOD OF CONDITIONING SPRAY DRIED PRODUCTS AND APPARATUS THEREFOR
Filed March 18, 1931  4 Sheets-Sheet 1

William Spencer Bowen

Feb. 13, 1934. W. S. BOWEN 1,946,566
METHOD OF CONDITIONING SPRAY DRIED PRODUCTS AND APPARATUS THEREFOR
Filed March 18, 1931 4 Sheets-Sheet 2

Inventor
William Spencer Bowen
By his Attorney

Feb. 13, 1934.    W. S. BOWEN    1,946,566
METHOD OF CONDITIONING SPRAY DRIED PRODUCTS AND APPARATUS THEREFOR
Filed March 18, 1931    4 Sheets-Sheet 3

Inventor
William Spencer Bowen
By his Attorney

Patented Feb. 13, 1934

1,946,566

UNITED STATES PATENT OFFICE 1,946,566

METHOD OF CONDITIONING SPRAY DRIED PRODUCTS AND APPARATUS THEREFOR

William Spencer Bowen, Westfield, N. J.

Application March 18, 1931. Serial No. 523,430

16 Claims. (Cl. 159—4)

The invention relates to desiccating or spray drying apparatus for the treatment of solid-containing liquids, semi-liquids, liquid emulsions, slurries, juices, syrups, etc., and to a novel method for carrying out the desiccating operation.

It has for an object to so conduct the desiccation that removal of the dry powdered product is obtained in a simple and expeditious manner and more particularly in an atmosphere conditioned with reference to the final powdered product. For example, some products such as sugars require to be chilled while in suspension so as to solidify them and prevent their coalescing and sticking to surfaces. Other products require lower temperature spray-drying but high temperature final drying so as to drive off the water of crystallization.

A further object of the invention resides in the provision of novel removal apparatus which may be operated directly by the flow of the conditioning medium itself, or by other means.

In carrying out the invention, the dry powdered product as it falls to the bottom of a drying chamber is arranged to be diverted to some predetermined collecting point by streams of fluid medium such as suitably conditioned air issuing from a series of properly located nozzles. These nozzles, for example, are carried by a rotatable member upon which the issuing jets react and may cause said member to rotate. The conditioning gaseous medium, moreover, may be arranged to flow through the nozzles as a result of the maintenance of a pressure in the drying chamber below that in the interior of the rotatable member.

In the prior art many arrangements have been proposed to introduce cooling air after the drying is substantially completed, but none has made use of a moving mechanism which ensures a positive turbulent mixture of air and product. This turbulent blanket over the floor of the drying chamber greatly facilitates final drying or conditioning of the product and at the same time absolutely ensures a floor clean of all product at all times. Moreover, the product cannot lodge anywhere, which is a very important feature as it reduces the dust explosion hazard to a minimum. In much of the prior art, the construction and arrangements disclosed have been such that the product has been allowed to collect upon the floor to be swept out by hand at intervals, or in many cases to be scraped out continuously by means of moving chains on conical walls or sides, or by rotating plows on a floor. By these expedients appreciable accumulations of the product are allowed to collect locally, thus forming often a serious explosion or fire hazard. By the method and in the use of the apparatus herein described, the danger from such causes is eliminated as it is impossible for the dusty final product to accumulate in appreciable quantities anywhere except in the dust collector where it is wanted.

In the accompanying drawings, Fig. 1 is a vertical section through a drying chamber which is provided at the bottom with the novel removal and cooling arrangement.

Figure 1:
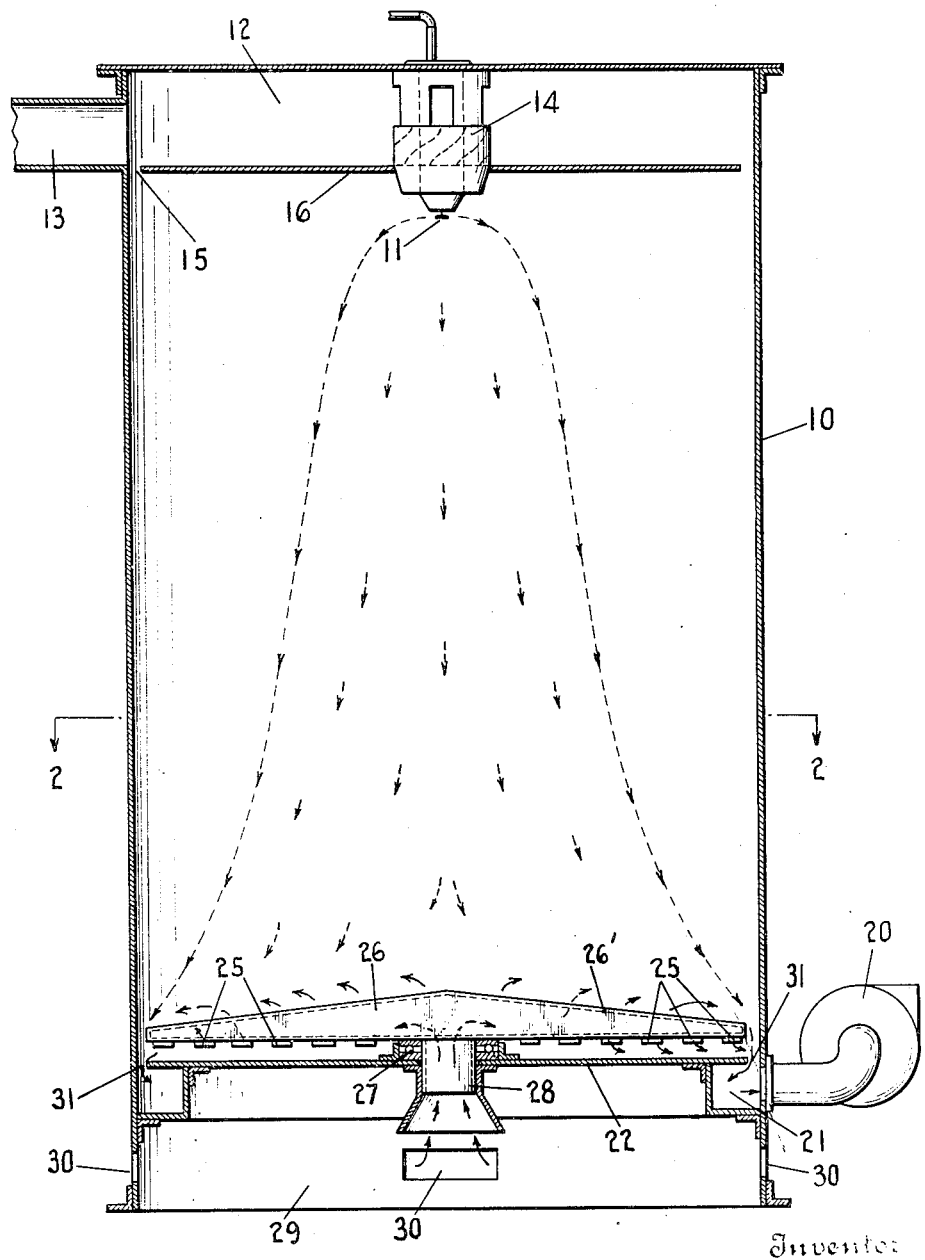
Figure 2:
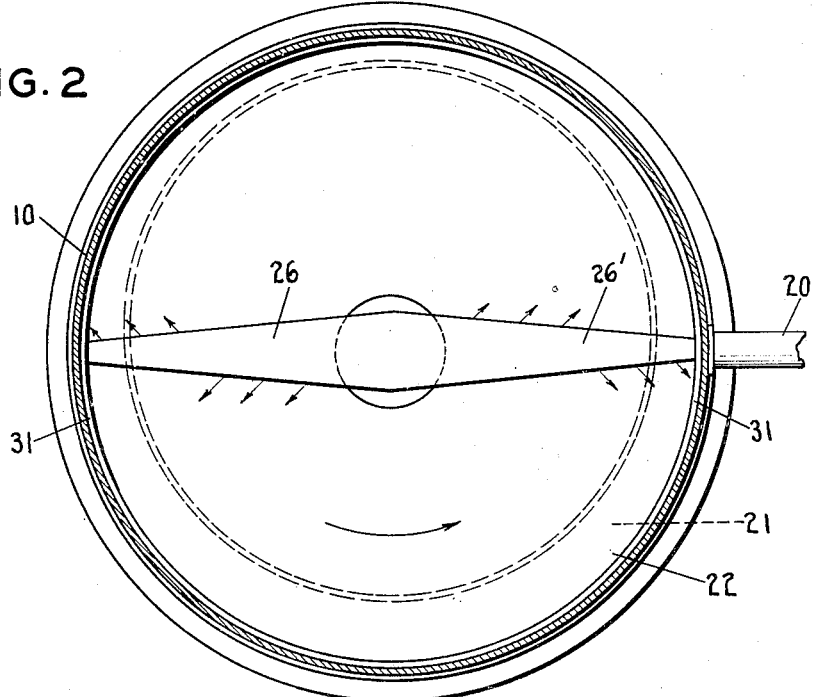
Fig. 2 is a horizontal section through the chamber, taken on the line 2—2, Fig. 1 of the drawings, and looking in the direction of the arrows.

Referring to the drawings, more particularly Fig. 1 thereof, 10 designates a tower provided with a suitable chamber wherein the drying operations may be conducted in the usual and well known manner, and wherein also the solid-containing liquid to be desiccated is finely sub-divided by suitable disintegrating means such as the centrifugal disintegrator 11. The latter is preferably located in the upper portion of the tower and is designed to be rotated at high velocity to disintegrate or finely subdivide a solid-containing liquid to the desired extent.

A heated gaseous drying medium is arranged to be introduced to the head 12 of the chamber through a duct 13, and through a supply and vaned head 14 communicating therewith is delivered into chamber 10. The said drying medium is introduced through the head 14, preferably, in a more or less swirling condition about the disintegrator 11. Provision is also made for introducing additional volumes of the gaseous drying medium into the chamber 10 as through an annular opening 15 located substantially at the circumference of the closing diaphragm 16 for the head 12.

As the incoming drying medium meets the spray thrown off from the disintegrator disk 11, the mixture of drying medium, spray and dried particles flows downwardly, substantially as indicated by the arrows, to the bottom of the chamber and under the action of a suction fan 20, the gaseous products being withdrawn through the bustle pipe 21 located below the bottom 22 and upon which latter the greater proportion of dried particles ordinarily are deposited and tend to collect.

It is an object of the present invention not only to provide for the expeditious removal of this product from the lower portion of the chamber and bottom 22, but also to surround the material deposited thereon with a suitably conditioned atmosphere. This is effected not only by keeping the floor itself at a controlled temperature, but also by providing in the space immediately above the same a layer of gaseous medium such as ordinary atmospheric air and conditioned as may be desired.

A convenient and economical arrangement for affording this supply of conditioned gaseous medium is to provide immediately above the floor a series of nozzles 25 which are designed to be supported by a hollow rotatable arm, or rather arms 26 and 26' extending in diametrically opposite directions from the axis of the tower. These arms are designed to be rotatably mounted above the floor as by means of a bearing 27, and are hollow and arranged to communicate with an inlet tube 28. The latter, in turn, communicates with a chamber 29 located below floor 22 and in communication with the outside atmosphere, as through an opening or openings 30 provided in the said chamber.

Thus, as the fan 20 produces and maintains an atmosphere of reduced pressure within the drying chamber 10, air will be drawn inwardly through the openings 30 and inlet pipe 28 and discharged through the various nozzles 25. These latter are directed toward the floor to sweep the powdered material collecting thereon toward an annular outlet 31, located about its circumference, and into the bustle pipe 21.

At the same time, the discharge of these streams of air from the respective nozzles effects a reaction couple upon the two arms 26 and 26' to cause the same to rotate about the bearing 27, which is located coaxially of the drying chamber 10. This rotary action will further assist in the distribution and removal of the powdered product from the floor 22; and as the issuing air impinges on said floor it will also tend to condition any particles of product lying thereon to the desired degree, as well as to control the temperature of the floor itself.

While the rotation of the arms 26, 26' has been shown as effected automatically by the pressure difference thus set up, it is understood that the said arms may be rotated by positive means and the conditioning gaseous medium introduced independently.

A positively rotated current of the conditioning gaseous medium is thereby set up, within the lower portion of the drying chamber, the medium swirling also in planes at right angles to its rotational direction. A certain amount of the conditioning air, furthermore, collects immediately above the arms 26, 26' tending to form a more or less turbulent blanket of conditioned air over the floor, as indicated by the rising arrows. This feature has a marked effect on the final condition of products passing therethrough and collecting upon the floor, particularly such products as sugars which normally have a low melting point and which must, therefore, be thoroughly cooled immediately upon drying.

Figure 3:
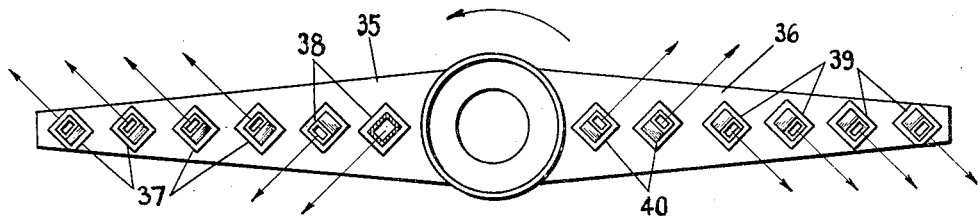
Figs. 3 and 4 are enlarged detail underneath views illustrating different arrangements of the nozzle members.

By variously positioning the nozzles, the rotative speed of the oppositely extending arms may be controlled, and the movement of the product particles, as well, may be directed in various ways as may be desired. For example, as indicated in Fig. 3 of the drawings, the arms 35 and 36 may each be provided with sets of nozzles 37, 38, and 39, 40 respectively. The sets of nozzles 38, 40 are fewer in number than the sets 37, 39 and the jets delivered therefrom are in directions at right angles to each other, as indicated by the arrows, thereby providing a retarding effect upon the action of the latter nozzles 37, 39 in causing rotation of the arms, which is in the direction indicated by the curved arrows.

Figure 4:
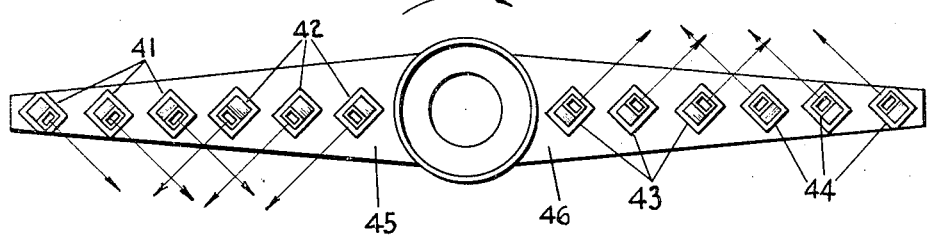

In Fig. 4, the two sets of nozzles 41, 42 and 43, 44 are so directed, as indicated by the arrows, as to concentrate the product at a point substantially midway of the center and circumference of the floor, and the arms 45, 46 carrying the respective nozzles rotate in a direction opposite to that indicated by the arrangement shown in Fig. 3.

With the arrangement of nozzles as indicated in Fig. 4 of the drawings, and wherein the product is concentrated at a midway position, arrangement is made for delivering the same as through slots 50 (Fig. 5 of the drawings) in the floor 51 to a screw conveyer 52 located beneath said slots and designed to remove the material as it is discharged into said conveyer.

In this particular embodiment, also, arrangement is made for removing the gaseous medium from the chamber 55 at a point above the floor 51 and through an external bustle pipe 56 which communicates with the interior of chamber 55 through slots 57 in the wall thereof.

An inverted frusto-conical shield 58 is also located along the inner wall of the chamber about the outlets 57 and tends to reduce the entrainment of particles with the gaseous medium passing through the slots 57, the shield being so designed and located about the said outlets 57 as not to favor entrainment of the dried powdered particles. Moreover, there will be provided by this arrangement in the space between floor 51 and said shield and outlets a protective blanket of cool air rising from the rotating discharge nozzles 59.

Figure 5:
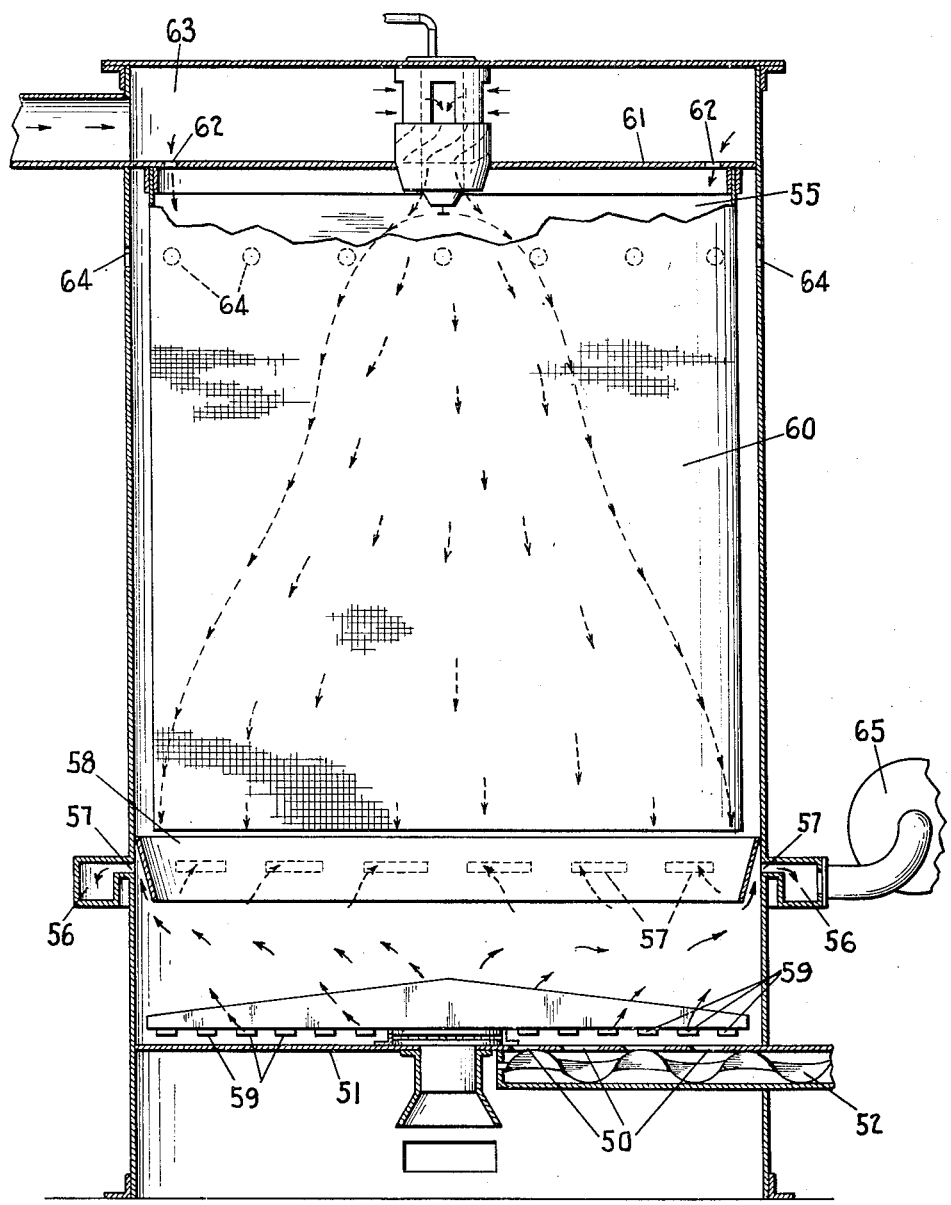
Fig. 5 is a vertical section through a drying chamber, and illustrates a modification in the arrangement for removing and cooling the product.

In order further to enhance the cooling effect, particularly along the wall portion of the chamber 55 above outlets 57, and to prevent particles of the desiccated product adhering to the wall portion, it is preferred to suspend therein a cylindrical fabric curtain 60 or lining displaced slightly from the wall of the tower (Fig. 5). This lining member may be suspended from the diaphragm 61 closing the upper end of the drying chamber, and extends substantially to the top of the shield 58.

Openings 62 arranged in the said diaphragm afford means of entry for the drying gaseous medium from the head 63 to chamber 55, and a series of openings 64 to the outside atmosphere is arranged in the wall of chamber 55 below the diaphragm 61. As the pressure within chamber 55 is maintained below that of the atmosphere surrounding the tower, as by means of the fan 65, cool air may be drawn in through the said openings 64 to afford a surrounding curtain of cooling air about the interior of the chamber 55 as defined by member 60 and as is set forth in my copending application Serial No. 276,018.

The interposition of the member 60 not only obviates dried or semi-dried particles adhering to the wall of chamber 55, but affords a cooled intermediate wall which tends to reduce the temperature of the particles and further prevent adhesion of the same to the lining material and coalescing of the particles.

Furthermore, the fabric lining being loosely hung from the top and free at the bottom will of necessity be in a constant state of flutter or vibration due to the impingement of the streams of cold air that enter through the holes 64. This constant flutter or vibration will tend to shed or dislodge any dusty product which might otherwise adhere to a smooth fixed side wall.

Not only is this fabric wall 60 cooled by the incoming air, but it has a lower specific heat than the metallic wall back of it and thus acts as a protection to delicate products.

Figure 6:
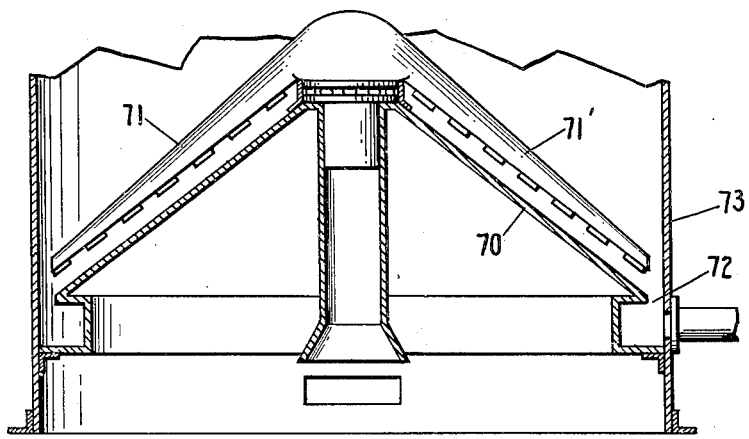
Figs. 6, 7 and 8 are fragmentary vertical sections illustrating modifications in the form of the collecting bottom and associated removal and conditioning means.
Figure 8:
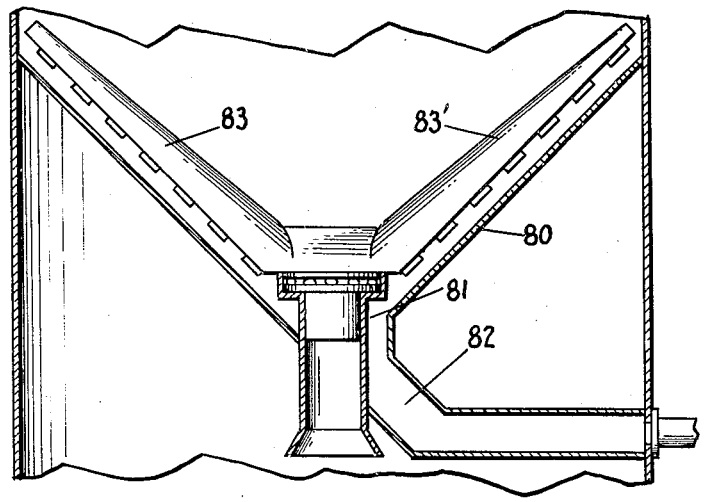
Figure 7:
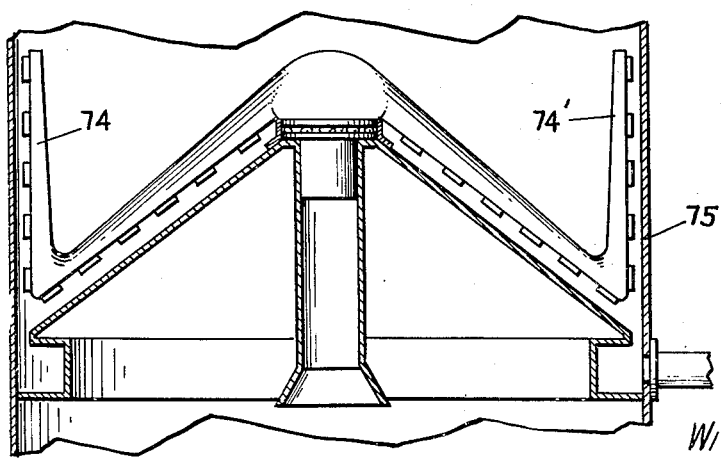

The form and arrangement of the removal or distributor member may be varied, if desired, from the particular embodiment illustrated in Figs. 1 to 5, inclusive, reference being had to Figs. 6 to 8, inclusive. For example, the bottom 70 of the drying chamber may be cone-shaped, Fig. 6, and the arms 71, 71' will then be correspondingly disposed with respect thereto, in which case the removal of the material is assisted by gravity, said material passing out through an annular opening 72 between the base of the bottom cone and the wall 73 of the drying chamber.

In this particular embodiment, also, the sweeper arms may be extended vertically as at 74, 74', Fig. 7, to direct streams of air against the sides of wall 75 for clearing the same of any powdered material tending to accumulate thereon and providing a cooling zone along the same.

An inverted cone or cup-shaped hopper bottom 80, Fig. 8, may also be provided and the material removed through a bottom outlet 81 into a chute 82. The arms 83, 83' of the rotating sweeper are then angularly disposed within the hopper substantially parallel to the floor as indicated.

I claim:

1. In desiccating apparatus embodying a tower and means to introduce therein solid-containing liquid in finely divided state, means to introduce into said tower a gaseous drying medium, and means connected with the tower for inducing a circulation of the gaseous medium therethrough: rotating means located within the tower in proximity to the bottom thereof for discharging therein in an annular path a conditioning gaseous medium distinct from said drying medium and directed toward said bottom for removal of the product dried in the tower.

2. In desiccating apparatus embodying a tower and means to introduce therein solid-containing liquid in finely divided state, means to introduce into said tower a gaseous drying medium, a floor for receiving the desiccated product, and means connected with the tower for inducing a circulation of the gaseous medium therethrough: rotating means located within the tower in proximity to the bottom thereof for discharging over the said floor in an annular path a conditioning gaseous medium distinct from the said gaseous drying medium.

3. In desiccating apparatus embodying a tower and means to introduce therein solid-containing liquid in finely divided state, means to introduce into said tower a gaseous drying medium, a floor for receiving the desiccated product, and means connected with the tower for inducing a circulation of the gaseous medium therethrough: rotating means located within the tower in proximity to the bottom thereof for discharging over the said floor and for directing upwardly therefrom along a portion of the tower wall a conditioning gaseous medium distinct from the said gaseous drying medium.

4. In desiccating apparatus embodying a tower and means to introduce therein solid-containing liquid in finely divided state, means to introduce into said tower a gaseous drying medium, and means connected with the tower for inducing a circulation of the gaseous medium therethrough: a rotating radially disposed member located within the tower in proximity to the bottom thereof for discharging over the bottom in an annular path a conditioning gaseous medium distinct from said gaseous drying medium for removal from the tower of any dried product settling upon the said bottom.

5. In desiccating apparatus embodying a tower and means to introduce therein solid-containing liquid in finely divided state, means to introduce into said tower a gaseous drying medium, and means connected with the tower for inducing a circulation of the gaseous medium therethrough: a radially disposed member rotatably mounted at the bottom of the tower and provided with discharge nozzles directed to discharge into the bottom of the tower, and means to admit to the member a gaseous conditioning medium adapted to effect rotation of the arms through discharge of the conditioning medium through said nozzles.

6. In desiccating apparatus embodying a tower and means to introduce therein solid-containing liquid in finely divided state, means to introduce into said tower a gaseous drying medium, and means connected with the tower for inducing a circulation of the gaseous medium therethrough: a reaction wheel having nozzles and rotatably mounted upon the bottom of the tower, and means to supply a conditioning gaseous medium thereto under a pressure in excess of that prevailing in the tower for rotating the reaction wheel through escape of the conditioning gaseous medium from said nozzles and the escaping gaseous medium being directed by said nozzles upon the bottom for lifting and moving any dried product settled thereon.

7. In desiccating apparatus embodying a tower and means to introduce therein solid-containing liquid in finely divided state, means to introduce into said tower a gaseous drying medium, and means connected with the tower for inducing a circulation of the gaseous medium therethrough and establishing a predetermined pressure within the tower: a reaction wheel rotatably mounted upon the bottom of the tower, means connecting the same with a surrounding atmosphere of a higher pressure than said predetermined pressure to effect a discharge of said atmospheric medium upon the floor of the tower as a plurality of jets directing the product to a predetermined portion of said bottom, and means to remove the collected product.

8. In desiccating apparatus embodying a tower and means to introduce therein solid-containing liquid in finely divided state, means to introduce into said tower a gaseous drying medium, and means connected with the tower for inducing a circulation of the gaseous medium therethrough and communicating with the interior of the tower through outlet openings provided in the wall thereof: a frusto-conical shield with base edge connected to the tower wall above the said outlet openings, and means located below the shield and in proximity to the bottom of the tower for 9. In desiccating apparatus embodying a tower and means to introduce therein solid-containing liquid in finely divided state, means to introduce into said tower a gaseous drying medium, and means connected with the tower for inducing a circulation of the gaseous medium therethrough and communicating with the interior of the tower through outlet openings provided in the wall thereof: a frusto-conical shield with base edge connected to the tower wall above the said outlet openings, a fabric curtain loosely hung from the top of the tower, extending substantially to the base edge of the shield and displaced from the tower wall, the latter being provided above the shield with openings to an external gaseous medium, and means located below the shield and in proximity to the bottom of the tower for discharging and rotating a conditioning gaseous medium therein.

10. In desiccating apparatus embodying a tower and means to introduce therein solid-containing liquid in finely divided state, means to introduce into said tower a gaseous drying medium, and means connected with the tower for inducing a circulation of the gaseous medium therethrough: an annular outlet at the bottom of the tower, and a rotatng radially disposed member located within the tower in proximity to the bottom thereof for discharging a conditioning gaseous medium distinct from said gaseous drying medium and directing the dried product thereby to the said annular opening.

11. In desiccating apparatus embodying a tower and means to introduce therein solid-containing liquid in finely divided state, means to introduce into said tower a gaseous drying medium, and means connected with the tower for inducing a circulation of the gaseous medium therethrough: an annular outlet at the bottom of the tower, a surface of revolution constituting the bottom of the tower and sloping toward the said outlet, and a rotating radially disposed member located within the tower in proximity to the bottom thereof and having nozzles for discharging a conditioning gaseous medium distinct from said gaseous drying medium and the nozzles being directed toward said bottom for removal of the dried product thereby to the said annular outlet.

12. In the spray-drying of solid-containing liquids, the method of conditioning the finely divided dried product within a drying chamber and removing the same therefrom, which comprises subjecting the dried product to a conditioning gaseous medium, distinct from the gaseous medium utilized for drying the product, as a current positively rotated in an annular path and directed toward the bottom of the drying chamber, and delivering therewith the dried product therefrom.

13. The method of spray-drying solid-containing liquids and removing the dried product, which comprises introducing a solid-containing liquid in finely divided state into a gaseous drying medium of a drying chamber to afford a powdered dried product, subjecting the dried product to a conditioning gaseous medium, distinct from the gaseous medium utilized for drying the product, as a current positively rotated in an annular path and directed toward the bottom of the drying chamber, and delivering therewith the dried product therefrom.

14. The method of spray-drying solid-containing liquids and removing the dried product, which comprises introducing a solid-containing liquid in finely divided state into a gaseous drying medium of a drying chamber to afford a powdered dried product, mechanically rotating in an annular path a current of conditioning gaseous medium, distinct from the gaseous medium utilized for drying the product and subjecting the dried product thereto, and directing the rotating medium toward the bottom of the drying chamber and delivering with the said rotating medium the dried product therefrom.

15. The method of spray-drying solid-containing liquids and removing the dried product, which comprises introducing a solid-containing liquid in finely divided state into a drying chamber, introducing simultaneously therewith into the chamber a gaseous drying medium to effect a powdered product of the solids of said solid-containing liquid, subjecting the dried product to a conditioning gaseous medium, distinct from the gaseous medium utilized for drying the product, as a current positively rotated in an annular path and directed toward the bottom of the drying chamber, and delivering with the said rotating medium the dried product therefrom.

16. The method of spray-drying solid-containing liquids and removing the dried product, which comprises introducing a solid-containing liquid in finely divided state within a drying chamber containing a gaseous drying medium to effect a powdered product within the chamber, surrounding the chamber with a gaseous conditioning atmosphere at a pressure above that within the chamber, introducing the gaseous conditioning atmosphere into the drying chamber to effect thereby a flow of said atmosphere within the chamber, positively rotating thereby in an annular path the said introduced atmosphere and discharging the same toward the bottom of the drying chamber, and delivering with the discharged and rotated atmosphere the dried product from the chamber.

WILLIAM SPENCER BOWEN.